US008065188B1

(12) United States Patent
Stolski (10) Patent No.: US 8,065,188 B1
(45) Date of Patent: Nov. 22, 2011

(54) DEDICATED PORTABLE COMPUTER SALES PRESENTATION SYSTEM

(76) Inventor: Sean M. Stolski, Ramsey, MN (US)

( * ) Notice: Subject to any disclaimer, the term of this patent is extended or adjusted under 35 U.S.C. 154(b) by 1172 days.

(21) Appl. No.: 11/774,091

(22) Filed: Jul. 6, 2007

Related U.S. Application Data

(63) Continuation-in-part of application No. 10/119,357, filed on Apr. 8, 2002, now Pat. No. 7,363,251.

(51) Int. Cl.
*G06Q 30/00* (2006.01)
(52) U.S. Cl. ........................................... 705/26; 705/27
(58) Field of Classification Search ................. 705/26.1, 705/27.1
See application file for complete search history.

(56) References Cited

U.S. PATENT DOCUMENTS 6,125,356 A * 9/2000 Brockman et al. .............. 705/37

OTHER PUBLICATIONS

Pooley, Have You Tried "User Friendly" Interviews? IS. Insurance Sales. Indianapolis: Aug. 1984. vol. 127, Iss. 8; p. 8, 3 pgs, downloaded from ProQuestDirect on the Internet on Feb. 26, 2011, 1page.*

Perez, David, Using interactive media for bank marketing and sales, Bank Marketing. Washington: May 1995. vol. 27, Iss. 5; p. 68, downloaded from ProQuestDIrect on the Internet on Jul. 27, 2011, 8 pages.*

* cited by examiner

*Primary Examiner* — James Zurita
(74) *Attorney, Agent, or Firm* — Neustel Law Offices (57) ABSTRACT

A dedicated portable computer sales presentation system for efficiently making a multimedia sales presentation at the location of a customer. The dedicated portable computer sales presentation system includes installing the required sales presentation files upon a hard drive of the portable computer system, enabling access to the Internet from the portable computer system and removing a media player from the portable computer system to allow the portable computer system to only be utilized for making a multimedia sales presentation to the customer. When the sales agent meets with a customer, the agent calls the company and answers a series of introduction questions relating to the customer and the call is terminated with the company recording the end time of the call as the start time of the sales presentation. The multimedia sales presentation (which may include a virtual tour run from the hard drive) is made upon the portable computer system and if a sale is made the necessary contract is printed for the customer to sign. The sales agent then shuts down the portable computer system and then calls the company to answer closing questions where after the call is terminated with the company recording the start time of the call as the end time of the sales presentation. The portable computer also preferably includes a tracking program to track any usage of the portable computer and also a start/end time of the sales presentation.

8 Claims, 6 Drawing Sheets

DEDICATED PORTABLE COMPUTER SALES PRESENTATION SYSTEM

CROSS REFERENCE TO RELATED APPLICATIONS

I hereby claim benefit under Title 35, United States Code, Section 120 of U.S. patent application Ser. No. 10/119,357 filed Apr. 8, 2002 now U.S. Pat. No. 7,363,251. This application is a continuation in-part of the 10/119,357 application. The 10/119,357 application is currently pending. The 10/119,357 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to computer devices and more specifically it relates to a dedicated portable computer sales presentation system for efficiently making a multimedia sales presentation at the location of a customer.

2. Description of the Related Art

Companies that make sales presentations for goods/services, such as vacation ownership property (e.g. timeshare), often times are forced to invite the potential customer to the site of the goods/services offered. To attract and encourage potential customers to travel a relatively significant distance, the company must offer incentives such as free gifts, money, free airfare, discounts and other incentives that are attractive to potential customers. Companies are aware that each industry has a "sales percentage" which is simply the number of sales made divided by the total number of sales presentations made. For example, some industries have a 10% sales percentage which requires the sales agent on average to make 10 sales presentations for each sale made. It is therefore extremely important for the sales agent to make as many sales presentations as possible during a given period of time to maximize the total number of sales for the company. In addition, based upon the sales percentage the company is limited by a financial threshold for offering incentives to potential customers. For example, if one sale nets a company $10,000 and the sales percentage is 10%, the maximum incentive per customer the company would be able to offer is $1,000 without having a negative net profit. Since a company needs to make a profit, the actual value of the incentive must be lower than the threshold.

The main problem with conventional sales presentation systems is that they are expensive to employ because of the incentives required to lure potential customers to the site of the company. Another problem with conventional sales presentation systems is that they are time consuming and not an efficient method of making a large number of sales presentations in a finite period of time. Another problem with conventional sales presentation systems is that they require the customer to travel a significant distance which is not desirable for the customer even with incentives. A further problem with conventional sales presentation systems is that the "incentives" typically have to increase over time as customers become overwhelmed with sales offers by numerous other companies.

While these sales presentation systems may be suitable for the particular purpose to which they address, they are not as suitable for efficiently making a multimedia sales presentation at the location of a customer. Conventional sales presentation systems require the potential customer to visit the site of the company and also typically require costly incentives provided by the company.

In these respects, the dedicated portable computer sales presentation system according to the present invention substantially departs from the conventional concepts and designs of the prior art, and in so doing provides a system primarily developed for the purpose of efficiently making a multimedia sales presentation at the location of a customer.

BRIEF SUMMARY OF THE INVENTION

In view of the foregoing disadvantages inherent in the known types of marketing techniques now present in the prior art, the present invention provides a new dedicated portable computer sales presentation system wherein the same can be utilized for efficiently making a multimedia sales presentation at the location of a customer.

The general purpose of the present invention, which will be described subsequently in greater detail, is to provide a new dedicated portable computer sales presentation system that has many of the advantages of the marketing techniques mentioned heretofore and many novel features that result in a new dedicated portable computer sales presentation system which is not anticipated, rendered obvious, suggested, or even implied by any of the prior art marketing techniques, either alone or in any combination thereof.

To attain this, the present invention generally comprises installing the required sales presentation files upon a hard drive of the portable computer system, blocking access to the Internet from the portable computer system and removing a media player from the portable computer system to allow the portable computer system to only be utilized for making a multimedia sales presentation to the customer. When the sales agent meets with a customer, the agent calls the company and answers a series of introduction questions relating to the customer and the call is terminated with the company recording the end time of the call as the start time of the sales presentation. The multimedia sales presentation is made upon the portable computer system and if a sale is made the necessary contract is printed for the customer to sign. The sales agent then shuts down the portable computer system and then calls the company to answer closing questions where after the call is terminated with the company recording the start time of the call as the end time of the sales presentation. The portable computer also preferably includes a tracking program to track any usage of the portable computer and also a start/end time of the sales presentation.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a dedicated portable computer sales presentation system that will overcome the shortcomings of the prior art systems.

A second object is to provide a dedicated portable computer sales presentation system for efficiently making a multimedia sales presentation at a location convenient for the customer such as the customer's home or place of business.

A further object is to provide a dedicated portable computer sales presentation system that increases the financial productivity from sales agents.

Another object is to provide a dedicated portable computer sales presentation system that makes a sales presentation without actually having the customer visit the goods or services being marketed.

Another object is to provide a dedicated portable computer sales presentation system that reduces the amount of time the sales agent might waste on non-sales related activities with a portable computer and that increases the amount of time the sales agent spends making sales presentations.

Another object is to provide a dedicated portable computer sales presentation system that reduces abuse of the portable computer by a sales agent.

An additional object is to provide a dedicated portable computer sales presentation system that reduces the likelihood of data/software theft by agents.

A further object is to provide a dedicated portable computer sales presentation system that reduces the overhead of a company by eliminating the need for Internet access.

Another object is to provide a dedicated portable computer sales presentation system that creates reports detailing sales representative's actions.

Another object is to provide a dedicated portable computer sales presentation system that does allow Internet access to send reports via email of a sales representative's actions.

A further object is to provide a dedicated portable computer sales presentation system that is affordable to produce and that can be easily duplicated and repaired.

Another object is to provide a dedicated portable computer sales presentation system that is not likely to be damaged (deliberately or accidentally) by a sales agent.

A further object is to provide a dedicated portable computer sales presentation system that is capable of making sales presentations for various types of goods and services.

Another object is to provide a dedicated portable computer sales presentation system that does not allow a sales agent to install computer operable programs.

A further object is to provide a dedicated portable computer sales presentation system with enhanced performance because no power management settings are used and all multimedia files are stored upon and read from the hard drive.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

1. Introduction

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a portable computer system. This includes, but is not limited to, magnetic and optical storage devices such as disk drives, magnetic tape, CDs (compact discs) and DVDs (digital versatile discs), and computer instruction signals embodied in a transmission medium (with or without a carrier wave upon which the signals are modulated). For example, the transmission medium may include a communications network, such as the Internet.

2. Portable Computer System

Figure 1:
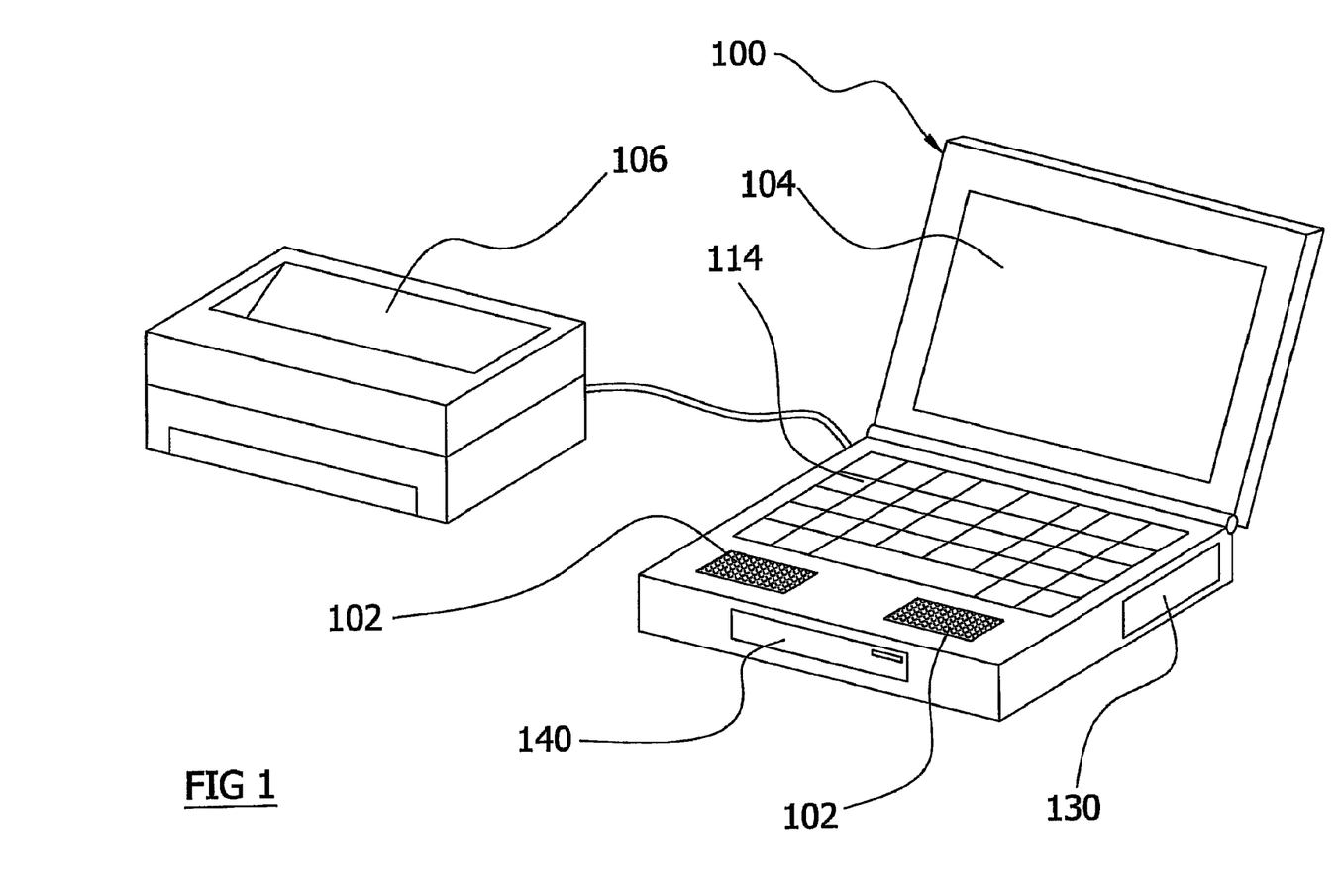
FIG. 1 is an upper perspective view of the present invention.
Figure 2:
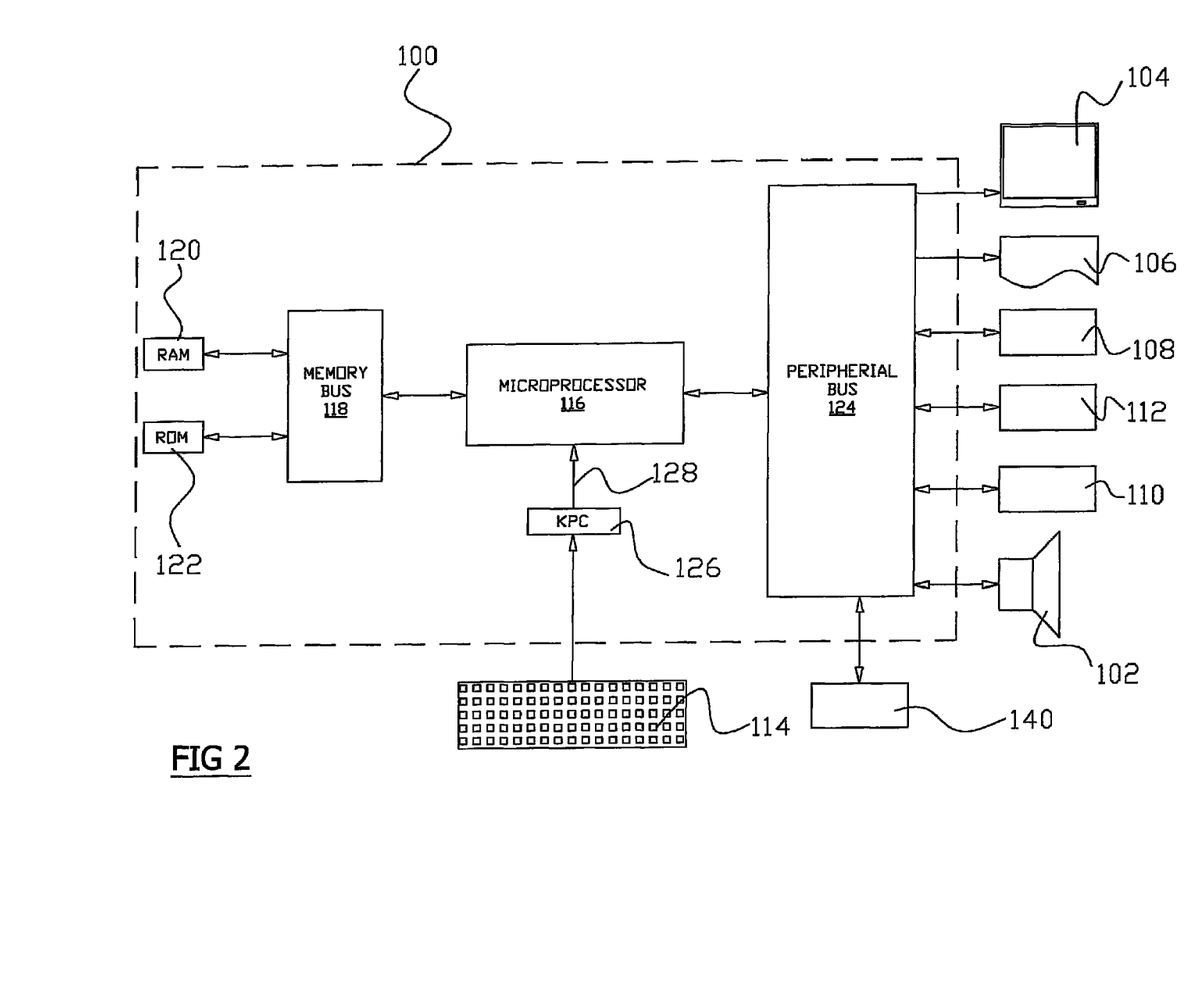
FIG. 2 is a block diagram of an exemplary portable computer system.

FIG. 2 is a block diagram of an exemplary portable computer system 100 for practicing the various aspects of the present invention. The portable computer system 100 includes a display screen 104, a printer 106, a floppy disk drive 108, a hard disk drive 110, a media player (e.g. CD-ROM, DVD) 140, a network interface 112, and a keyboard 114. The portable computer system 100 includes a microprocessor 116, a memory bus 118, random access memory (RAM) 120, read only memory (ROM) 122, a peripheral bus 124, and a keyboard controller 126. The portable computer system 100 is preferably comprised of a compact structure such as laptop and notebook computers manufactured by companies like APPLE computer and DELL computer, or one of the compatibles thereof.

The microprocessor 116 is a general-purpose digital processor that controls the operation of the portable computer system 100. Microprocessor 116 can be a single-chip processor or implemented with multiple components. Using instructions retrieved from memory, microprocessor 116 controls the reception and manipulations of input data and the output and display of data on output devices.

The memory bus 118 is utilized by the microprocessor 116 to access the RAM 120 and the ROM 122. RAM 120 is used by microprocessor 116 as a general storage area and as scratch-pad memory, and can also be used to store input data and processed data. ROM 122 can be used to store instructions or program code followed by microprocessor 116 as well as other data.

Peripheral bus 124 is used to access the input, output and storage devices used by the portable computer system 100. In the described embodiment(s), these devices include a display screen 104, a printer device 106, a floppy disk drive 108, a hard disk drive 110, and a network interface 112. A keyboard controller 126 is used to receive input from the keyboard 114 and send decoded symbols for each pressed key to microprocessor 116 over bus 128.

The display screen 104 is an output device that displays images of data provided by the microprocessor 116 via the peripheral bus 124 or provided by other components in the portable computer system 100. The display screen 104 may be comprised of a flat-panel active matrix, passive matrix or other suitable display. The printer device 106 when operating as a printer provides an image on a sheet of paper or a similar surface. Other output devices such as a plotter, typesetter, etc. can be utilized in place of, or in addition to, the printer device 106.

The floppy disk drive 108 and the hard disk drive 110 can be utilized to store various types of data. The floppy disk drive 108 facilitates transporting such data to other portable computer systems, and the hard disk drive 110 permits fast access to large amounts of stored data.

The microprocessor 116 together with an operating system operate to execute computer code and produce and use data. The computer code and data may reside on RAM 120, ROM 122, or hard disk drive 110.

The network interface circuit 112 is utilized to send and receive data over a network connected to other portable computer systems. An interface card or similar device and appropriate software implemented by microprocessor 116 can be utilized to connect the portable computer system 100 to an existing network and transfer data according to standard protocols.

The keyboard 114 is used by a user to input commands and other instructions to the portable computer system 100. Other types of user input devices can also be used in conjunction with the present invention. For example, pointing devices such as a computer mouse, a trackball, a stylus, or a tablet to manipulate a pointer on a screen of the portable computer system 100.

3. First Method of Configuring the Computer System

Figure 3:
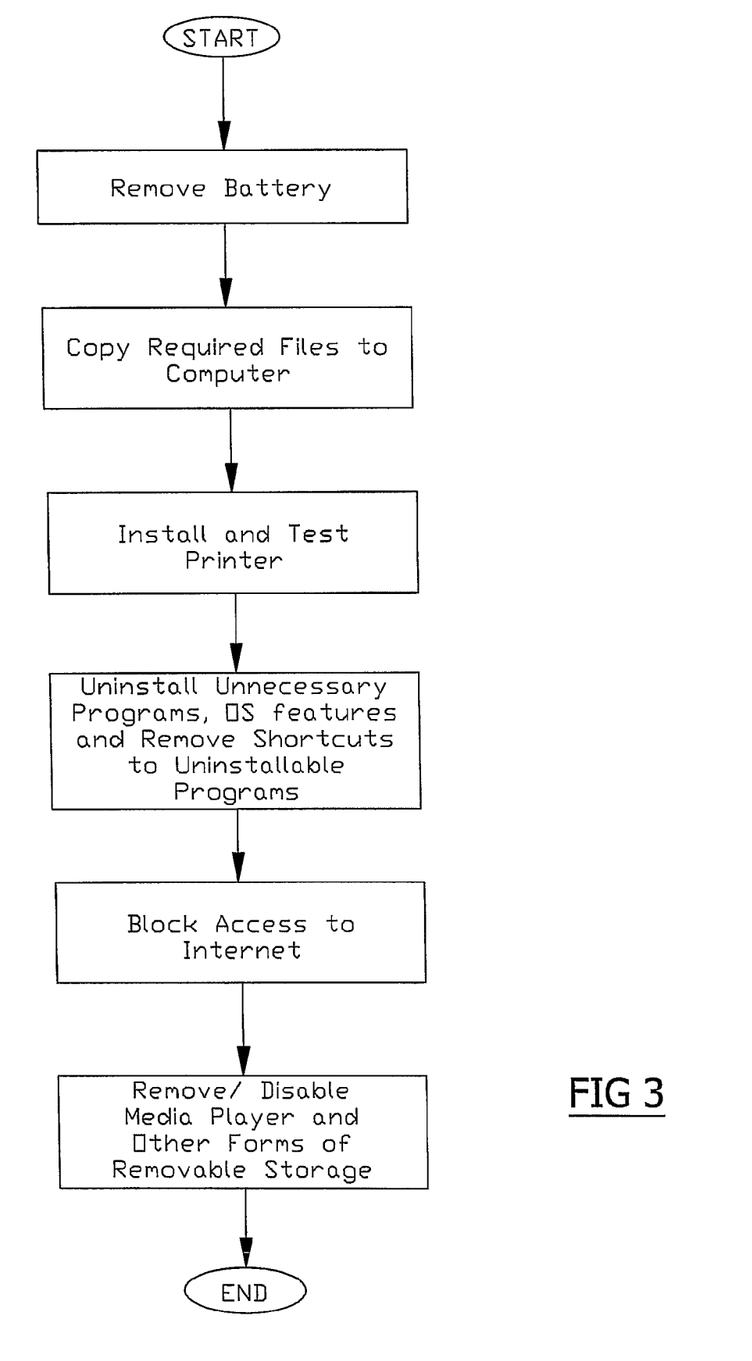
FIG. 3 is a flowchart illustrating the configuration of the portable computer system.

The computer system 100 is initially setup by the company prior to providing it to the sales agent. If the computer system 100 was manufactured with a battery 130, the company removes the battery 130 and sets the power settings to assume AC power is always utilized thereby improving the overall performance of the computer system 100.

The company then installs the required sales presentation files upon the hard drive 110 of the portable computer system 100. Required sales presentation files include but are not limited to data files and software programs. Data files include multimedia files to be presented to the customer which may include video and/or audio. The multimedia files may be comprised of various well-known file formats readable by a multimedia program. The data files further include any documents that may be required to make a sale with a customer. Additionally, a virtual tour may be installed and run from the hard drive only. It is viewed with a browser, such as NETSCAPE, MICROSOFT INTERNET EXPLORER or MOZILLA FIREFOX.

The software programs installed upon the computer system 100 include multimedia programs that are capable of playing the multimedia files such as WINDOWS MEDIA PLAYER or other multimedia playing programs. Additional software programs may be installed to allow for the loading, editing and printing of a document such as MICROSOFT WORDPAD, OPENOFFICE.ORG WRITER, similar text editing programs, or word processors. In addition, software programs utilized to limit the access and usage of the computer system 100 for sales presentations are preferably utilized such as NORTON INTERNET SECURITY, ZONE ALARM or other Internet blocking programs.

After the data and software program files have been installed upon the computer system 100, the company then installs and tests the printer 106. The required drivers are preferably transferred during the copying of files step of the computer configuration process, but may be installed later during the configuration process. A test page is preferably printed to ensure that the printer 106 is fully operational.

The company then uninstalls any unnecessary software programs, files and OS features from the computer system 100 that are not required to make the multimedia presentation. Programs such as games, graphical editors and other programs are removed from the computer system 100 to prevent the sales agent from spending time on non-sales orientated matters. In addition to removing software programs, all shortcuts are removed to uninstallable programs such as the MS-DOS prompt.

The company then blocks all access to the Internet from the portable computer system by first turning off or removing the modem and/or network interface 112. The Internet blocking software is then adjusted to ensure that software programs like MICROSOFT INTERNET EXPLORER, NETSCAPE, MOZILLA FIREFOX or MICROSOFT OUTLOOK cannot access the Internet.

The company then removes the media player 140 (e.g. CD-ROM, DVD player or floppy drive) from the portable computer system to allow the portable computer system to only be utilized for making a multimedia sales presentation to the customer based upon the data contained upon the hard drive. Instead of removing the media player 140, the user may simply "disable" the media player 140 utilizing the BIOS or similar method. Other security steps may be taken to ensure that the computer system 100 is only utilized for sale presentations and not for personal matters of the sales agent.

The computer system 100 is then checked to confirm that it is properly setup. After a proper setup has been confirmed, the company then provides the computer system 100 to the sales agent for usage with customers.

4. Second Method of Configuring the Computer System

Figure 5:
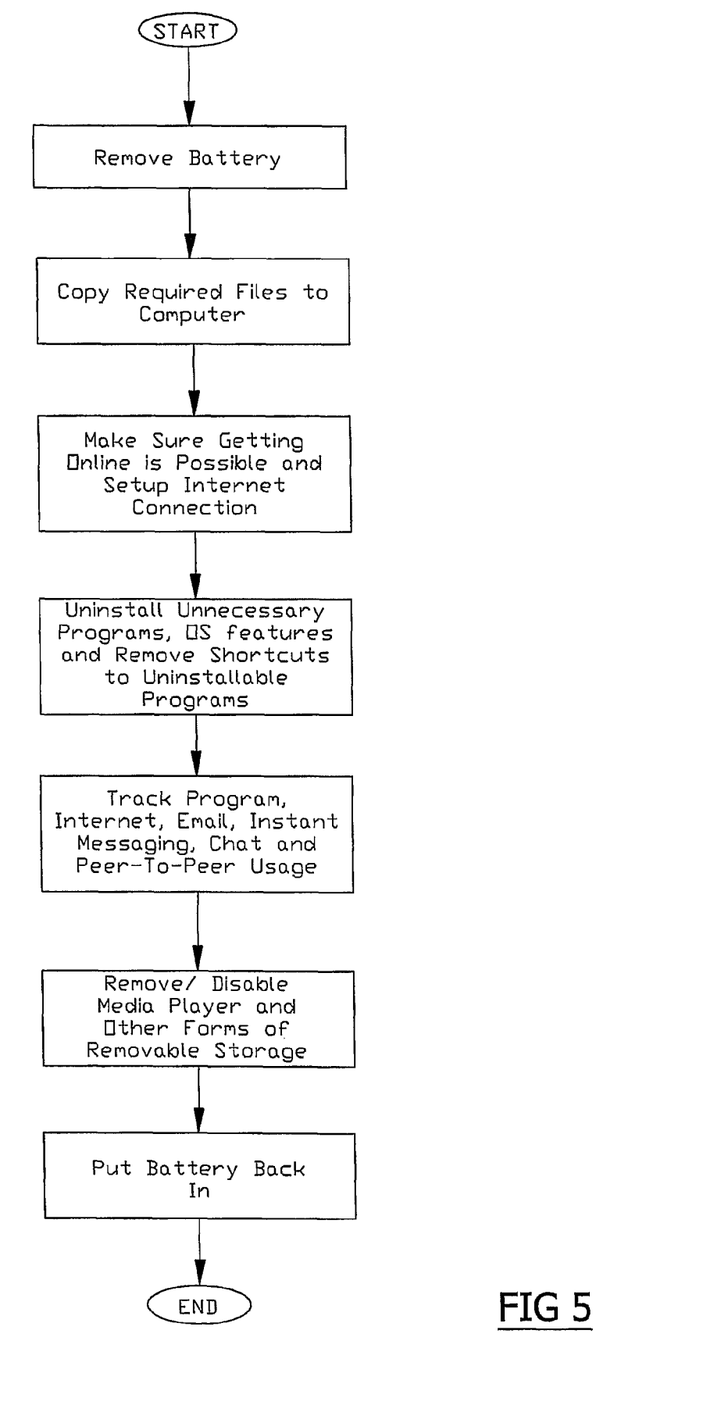
FIG. 5 is a flowchart illustrating the alternated configuration of the portable computer system.

The following is an alternative method of configuring the computer system 100, wherein the following is also illustrated in FIG. 5. It is appreciated that the various methods of configuring the computer system 100 may be utilized together or separately. The computer system 100 is setup by the company prior to usage by the sales agent. The battery 130 of the computer system 100 is also removed during setup, wherein the computer system 100 runs on AC power.

The alternative method of configuring the computer system 100 utilizes the Internet to send and receive emails detailing the sales agent's activities. The activity report recorded by the computer includes various useful reporting data, such as but not limited to what programs the representative ran, contents of emails, what programs the representative downloaded and installed and when the computer system 100 and/or specific programs were operated.

To track what the representative does on the computer system 100 tracking software is installed upon the computer prior to usage by the representative. The tracking software can be comprised of various types of computer tracking software, such as but not limited to EBLASTER. The tracking software also sends the reports via email to management at various times once on the Internet. The tracking software program also attempts to email a usage report approximately once per hour. Additionally, any emails sent by the user are also preferably sent to the recipient immediately after the user sends the email.

The tracking software also frequently logs data pertaining to the usage of the computer system 100 as well as keystrokes typed. The logging of data by the tracking software is to ensure the representative is working sufficiently and not abusing privileges (i.e. installing games on company's computer system 100, etc.).

The Internet Service Provider (ISP) connection is also setup prior to giving the computer system 100 to the sales agent, wherein various ISPs may be utilized such as but not limited to OUTDOORS UNLIMITED. A shortcut to the Internet connection is also made. The properties of the ISP are also preferably set so TCP/IP and QoS (Quality of Service) are the only protocols utilized.

An antivirus, firewall and/or Internet security software are now installed upon the computer system 100. The software is set to automatically update itself when software updates are available. Any USB (universal serial bus) controllers and PC card controllers are also disabled. It is appreciated that a USB port may be left enabled if the USB port is utilized by the printer 106. It is also ensured that any hardware that may allow access to the computer system 100 from an outside environment (i.e. INTERNET) is disabled, such as but not limited to network interface 112 cards. It is also appreciated that if modems cease to become available, other built-in hardware may be utilized to access the Internet.

Various programs that are not utilized during the sales presentation or needed to satisfactorily perform the sales agent's job are also removed from the computer system 100 as previously detailed in the first method of configuring the computer system 100. Other tasks related to setting up a computer system 100 are also performed, such as setting time zone requirements, going through introductory videos for the operating system, installing necessary drivers and various other tasks.

It is appreciated that various start menu, desktop shortcuts/programs and/or folders are also removed so as not to distract the sales agent. Various shortcuts include the uninstaller for the printer 106, Program Compatibility Wizard, Hyper Terminal, Games folder, WINDOWS EXPLORER, Command prompt, Imaging, Notepad and WINDOWS UPDATE, My Documents, My Music, My Pictures and Search. It is appreciated that various programs/commands are referred to throughout the description of the present invention, wherein the programs are common in the art of MICROSOFT WINDOWS and the programs are not to be limiting or excluding, wherein various other operating systems (i.e. APPLE, etc.) may have various names for programs that perform similar tasks.

It is appreciated that various other duties are performed by management prior to the sales presentation, such as but not limited to removing packaging from the computer case, printer 106 and/or printer cable. The printer 106 is also setup in a similar method as in the first method of configuring the computer system 100. It is also appreciated that the serial numbers of all the computer systems 100 utilized with the sales agents are recorded by management to ensure management is aware of which sales agent has which computer system 100.

The user also removes the media player 140 (e.g. CD-ROM, DVD player or floppy drive) from the computer system 100 to allow the computer system 100 to only be utilized for making a multimedia sales presentation to the customer based upon the data contained upon the hard drive. Instead of removing the media player 140, the user may simply "disable" the media player 140 utilizing the BIOS and/or other methods. Other security steps may be taken to ensure that the computer system 100 is only utilized for sale presentations and not for personal matters of the sales agent.

The computer system 100 is then checked to confirm that it is properly setup. The battery 130 is reinstalled in the computer system 100. After a proper setup has been confirmed, the company then provides the computer system 100 to the sales agent for usage with customers.

5. Operation of the Dedicated Portable Computer Sales Presentation System

Figure 4:
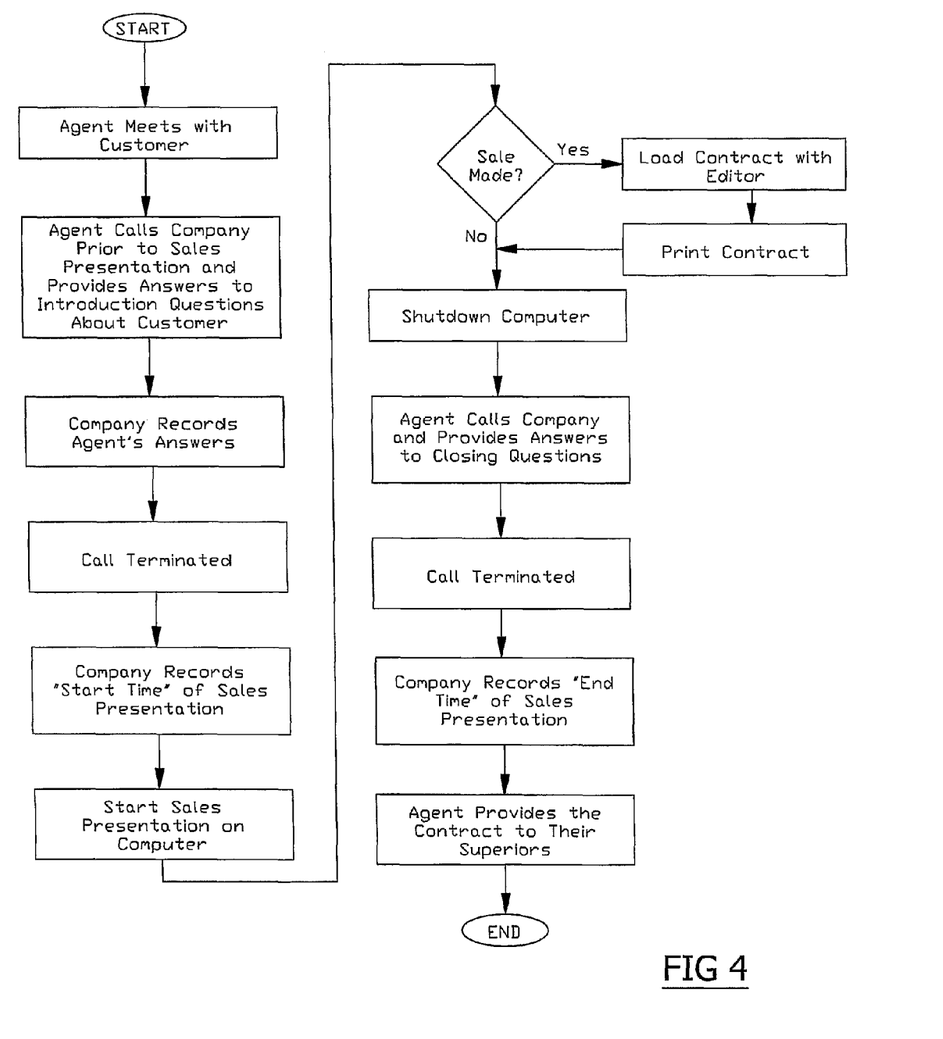
FIG. 4 is a flowchart illustrating the sales presentation process utilizing the portable computer system.

As shown in FIG. 4 of the drawings, when the sales agent meets with a customer, the agent calls the company and answers a series of introduction questions relating to the customer. Questions such as "What is the name of the customer?", "What is the address of the customer?" and "What is the phone number of the customer?" are examples of possible questions asked. Should the call be answered by voice mail, etc. the agent will say they are about to start a sales presentation and mention the time, date, name and address of the potential customer. The answers provided by the sales agent are also utilized to create a new database record which contains the sales agent's information along with the customer's identification.

The call is then terminated with the company and the company records the end time of the call as the "start time" of the sales presentation within the database. The multimedia sales presentation is then made upon the portable computer system 100 by loading the multimedia file which is played with the appropriate program upon the computer system 100. The customer views the sales presentation upon the display screen 104 of the computer system 100.

It can be appreciated that the multimedia sales presentation may be continuous, interrupted with periodic printed materials or interactive with the customer participating within the multimedia presentation. The presentation may additionally include viewing a virtual tour, which is a website or portion thereof that displays pictures on the display 104. The tour is stored on the hard drive 110 and viewed with a browser, such as MICROSOFT INTERNET EXPLORER.

At the end of the sales presentation, if a sale is made requiring a contract to be signed by the customer, the sales agent then loads the contract into a text editor such as MICROSOFT WORDPAD or MICROSOFT WORD. The sales agent enters the required information relating to the sale and then prints the contract for the customer to sign.

The sales agent then shuts down the portable computer system 100 after the execution of the contract or the end of the sales presentation. The sales agent then calls the company to answer a series of closing questions such as "Did you make a sale?", "How much was the transaction?" and "Did the customer sign the contract?". If the call is answered by voice mail, etc. the agent will say they are about to finish the sales presentation and mention the time, date, name and address of the customer.

After the call is terminated with the company the company records the start time of the call as the "end time" of the sales presentation within the database. The sales agent then may mail, hand-deliver or fax the executed contract to the company. The company may process a sale at this time or the agent may process it using a web portal of a credit card processing company or an e-commerce enabled website. The agent will use some form of regular mail (e.g. DHL, Federal Express, etc.) if payment is made by check.

The database records created by the company in monitoring the usage of the computer system 100 allows the company to verify and monitor each sales agent's performance and productivity. The company can thereby determine whether a particular sales agent is effectively utilizing their time in making sales presentations. Benefits and incentives may be offered to the sales agents based upon this data. The company may also verify the data within the database by checking the time of phone records since the sales agent will call the company via a toll-free number. Computer usage reports created by the tracking software will be reviewed and ISP records may also be reviewed by the company.

Figure 6:
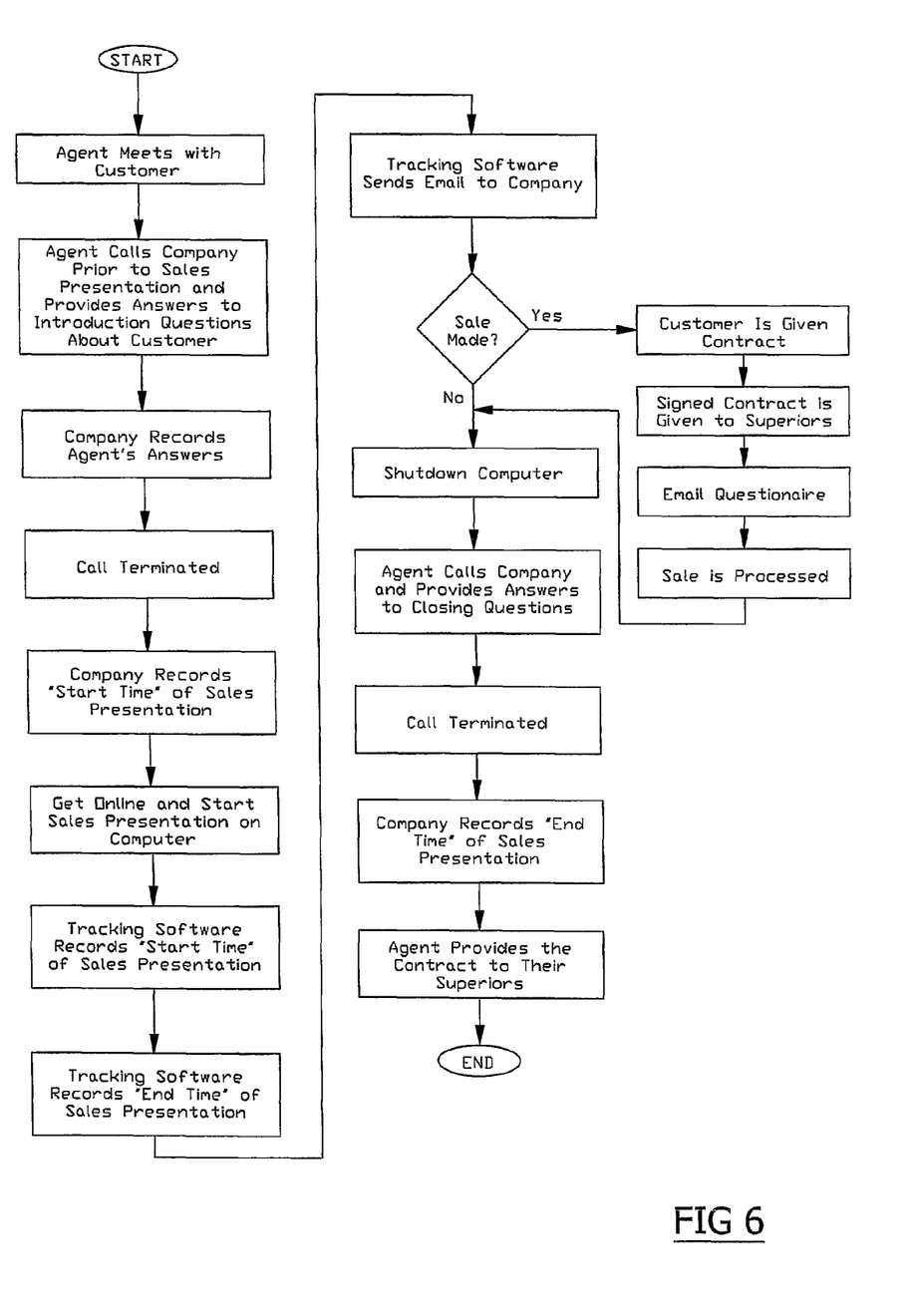
FIG. 6 is a flowchart illustrating the alternate configuration of the sales presentation process utilizing the portable computer system.

The tracking software will inform the company via email of the start/end time of the sales presentation in addition to the sales agent calling the company. The email sent by the tracking software preferably includes the start/end time of the sales presentation by recording when a particular file was opened/closed. The tracking software also preferably is able to inform the company of keystrokes typed, emails sent/received, instant messages sent/received, chat messages sent/received, peer-to-peer file sharing and programs installed or downloaded, running or previously running upon the computer system 100 in the email sent to the company as shown in FIG. 6.

As to a further discussion of the manner of usage and operation of the present invention, the same should be apparent from the above description. Accordingly, no further discussion relating to the manner of usage and operation will be provided.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

| | |
|---|---|
| 100. | Computer System |
| 101. | |
| 102. | Speaker |
| 103. | |
| 104. | Display Screen |
| 105. | |
| 106. | Printer |
| 107. | |
| 108. | Floppy Disk Drive |
| 109. | |
| 110. | Hard Disk Drive |
| 111. | |
| 112. | Network Interface |
| 113. | |
| 114. | Keyboard |
| 115. | |
| 116. | Microprocessor |
| 117. | |
| 118. | Memory Bus |
| 119. | |
| 120. | RAM |
| 121. | |
| 122. | ROM |
| 123. | |
| 124. | Peripheral Bus |
| 125. | |
| 126. | Keyboard Controller |
| 127. | |
| 128. | Bus |
| 129. | |
| 130. | Battery |
| 131. | |
| 132. | |
| 133. | |
| 134. | |
| 135. | |
| 136. | |
| 137. | |
| 138. | |
| 139. | |
| 140. | Media Player |

I claim:

1. A method of customizing a multimedia sales presentation utilizing a dedicated portable computer, said method comprising the steps of:

creating, by a computing device at a first company, a multimedia sales presentation;

customizing, by said computing device, said multimedia sales presentation for a selected customer to create a customized multimedia sales presentation;

downloading by a portable computer, said customized multimedia sales presentation;

installing, upon said portable computer, said customized multimedia sales presentation;

in response to said installing, creating, by said portable computer, a first list of installed software and objects related to said customized multimedia sales presentation, said first list, for each installed software, including parameters, said parameters including memory usage, CPU time and network baseline;

providing said portable computer to a sales agent of the first company;

meeting, by said sales agent with said portable computer, with the selected customer at a location of said selected customer, the sales agent;

recording, by said portable computer, a start time of said customized multimedia sales presentation in response to launching, by said portable computer, said customized multimedia sales presentation;

presenting said customized multimedia sales presentation to said selected customer at said location of said customer;

tracking, by said portable computer, into a second list, activities that take place during said step of presenting, said activities including keystrokes, visits to websites, sending and receiving emails, sending and receiving chats, sending and receiving instant messages and including peer-peer file sharing that take place during said step of presenting;

recording, by said portable computer, an end time of said multimedia sales presentation;

collating, by said portable computer, said first list, said second list, said start time and said end time into a sales presentation report; and transmitting, by said portable computer, an email to the device at the first company, said email including the sales presentation report.

2. The method of customizing a multimedia sales presentation of claim 1, including a step of calling said company at said start time of said sales presentation.

3. The method of customizing a multimedia sales presentation of claim 2, including a step of answering a series of first questions when calling said company at said start time of said sales presentation.

4. The method of customizing a multimedia sales presentation of claim 3, including a step of calling said company at said end time of said sales presentation.

5. The method of customizing a multimedia sales presentation of claim 4, including a step of answering a series of second questions when calling said company at said end time of said sales presentation.

6. The method of customizing a multimedia sales presentation of claim 5, wherein said company records answers to said series of first questions and said series of second questions within a database.

7. A method of customizing a multimedia sales presentation utilizing a dedicated portable computer, said method comprising the steps of:

creating, by a computing device at a first company, a multimedia sales presentation;

customizing, by said computing device, said multimedia sales presentation for a selected customer to create a customized multimedia sales presentation;

downloading by a portable computer, said customized multimedia sales presentation;

installing, upon said portable computer, said customized multimedia sales presentation;

in response to said installing, creating, by said portable computer, a first list of installed software and objects related to said customized multimedia sales presentation, said first list, for each installed software, including parameters, said parameters including memory usage, CPU time and network baseline;

providing said portable computer to a sales agent of the first company;

meeting, by said sales agent with said portable computer, with the selected customer at a location of said selected customer, the sales agent;

calling said first company to record a start time of said meeting and answer a series of first questions relating to said meeting;

recording, by said portable computer, a start time of said customized multimedia sales presentation in response to launching, by said portable computer, said customized multimedia sales presentation;

presenting said customized multimedia sales presentation to said selected customer at said location of said customer;

tracking, by said portable computer, into a second list, activities that take place during said step of presenting, said activities including keystrokes, visits to websites, sending and receiving emails, sending and receiving chats, sending and receiving instant messages and including peer-peer file sharing that take place during said step of presenting;

recording, by said portable computer, an end time of said multimedia sales presentation;

collating, by said portable computer, said first list, said second list, said start time and said end time into a sales presentation report; and transmitting, by said portable computer, an email to the device at the first company, said email including the sales presentation report.

8. The method of customizing a multimedia sales presentation of claim 7, wherein said first company records answers to said series of first questions within a database.

* * * * *